Patented Feb. 9, 1943

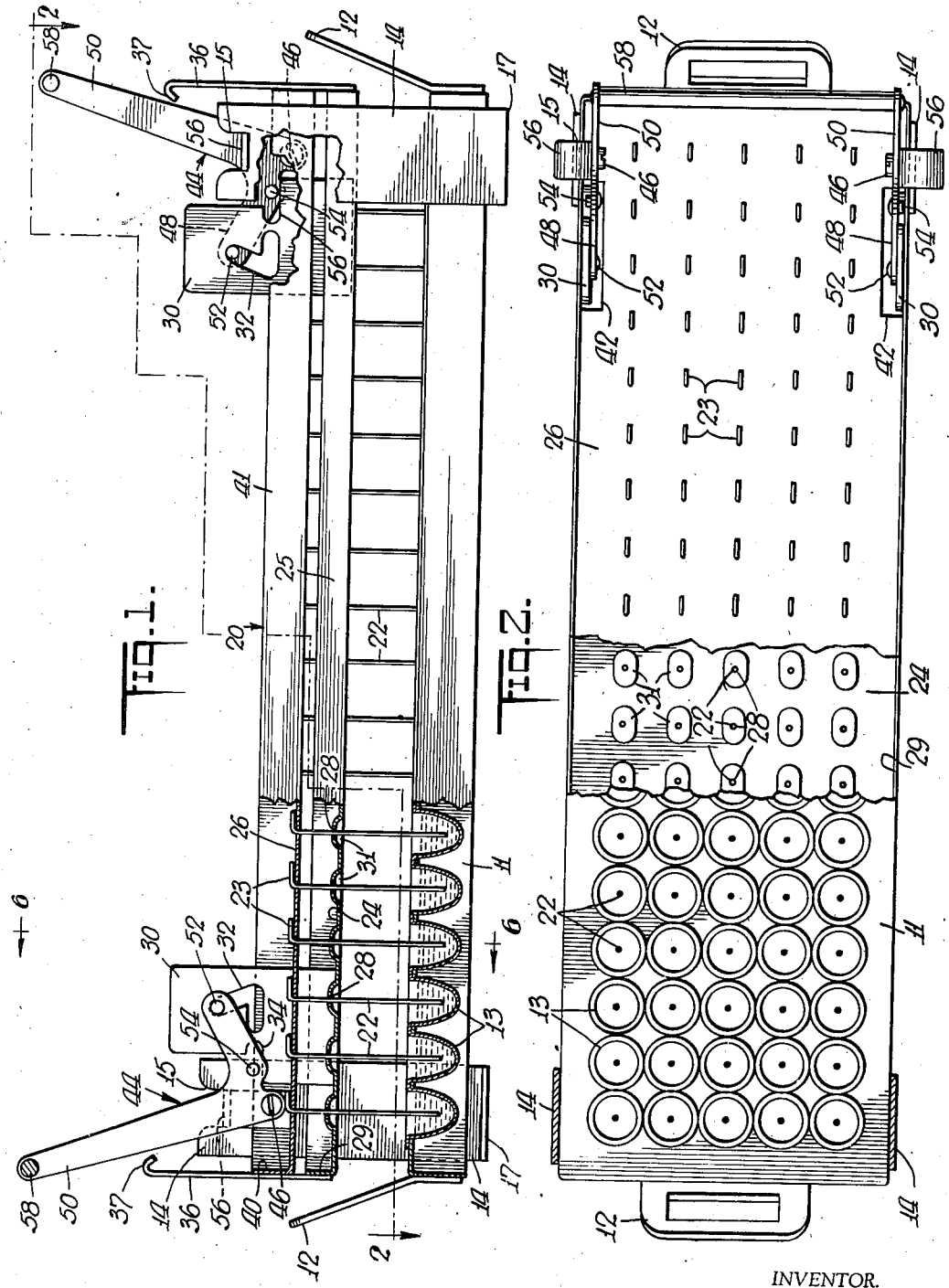

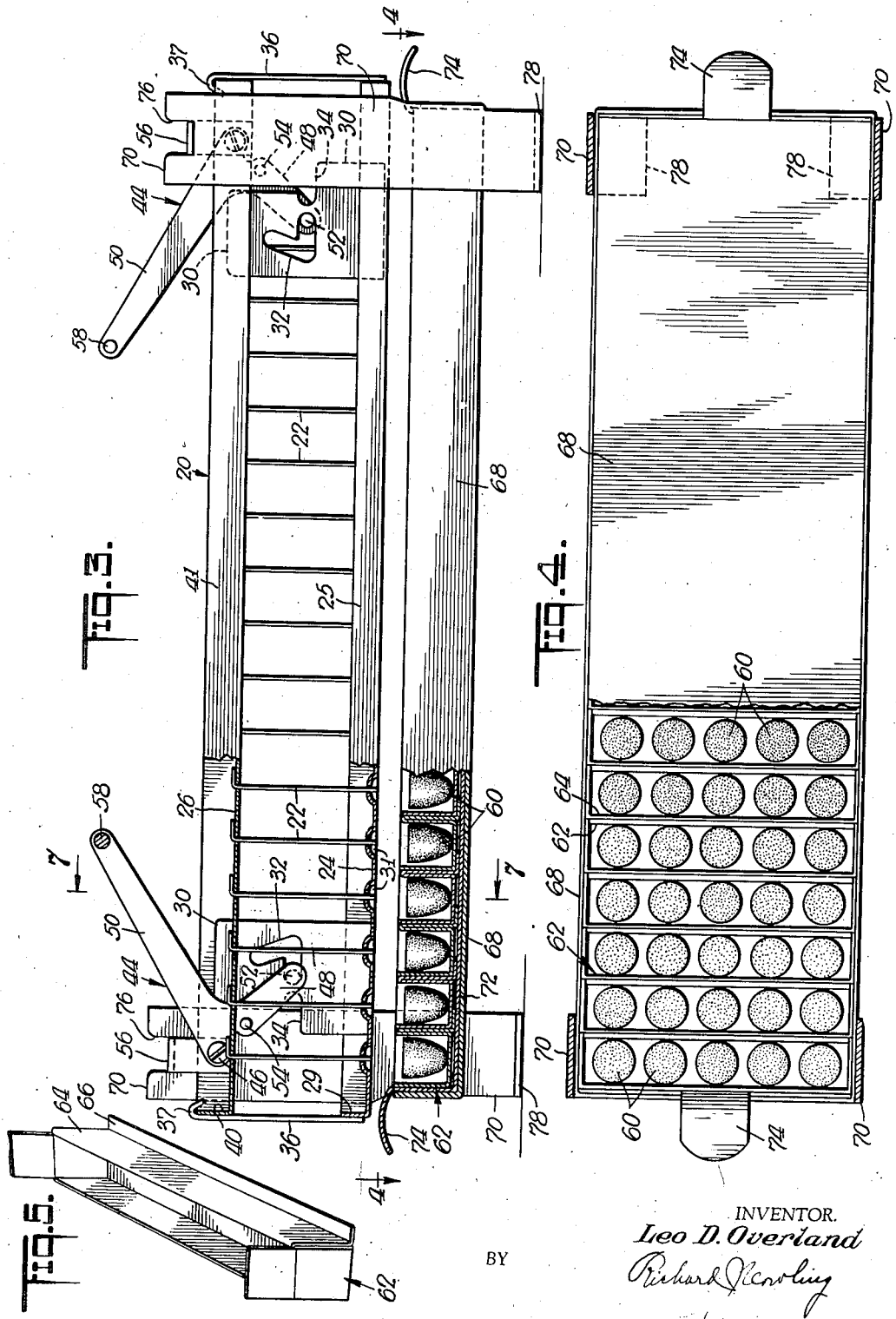

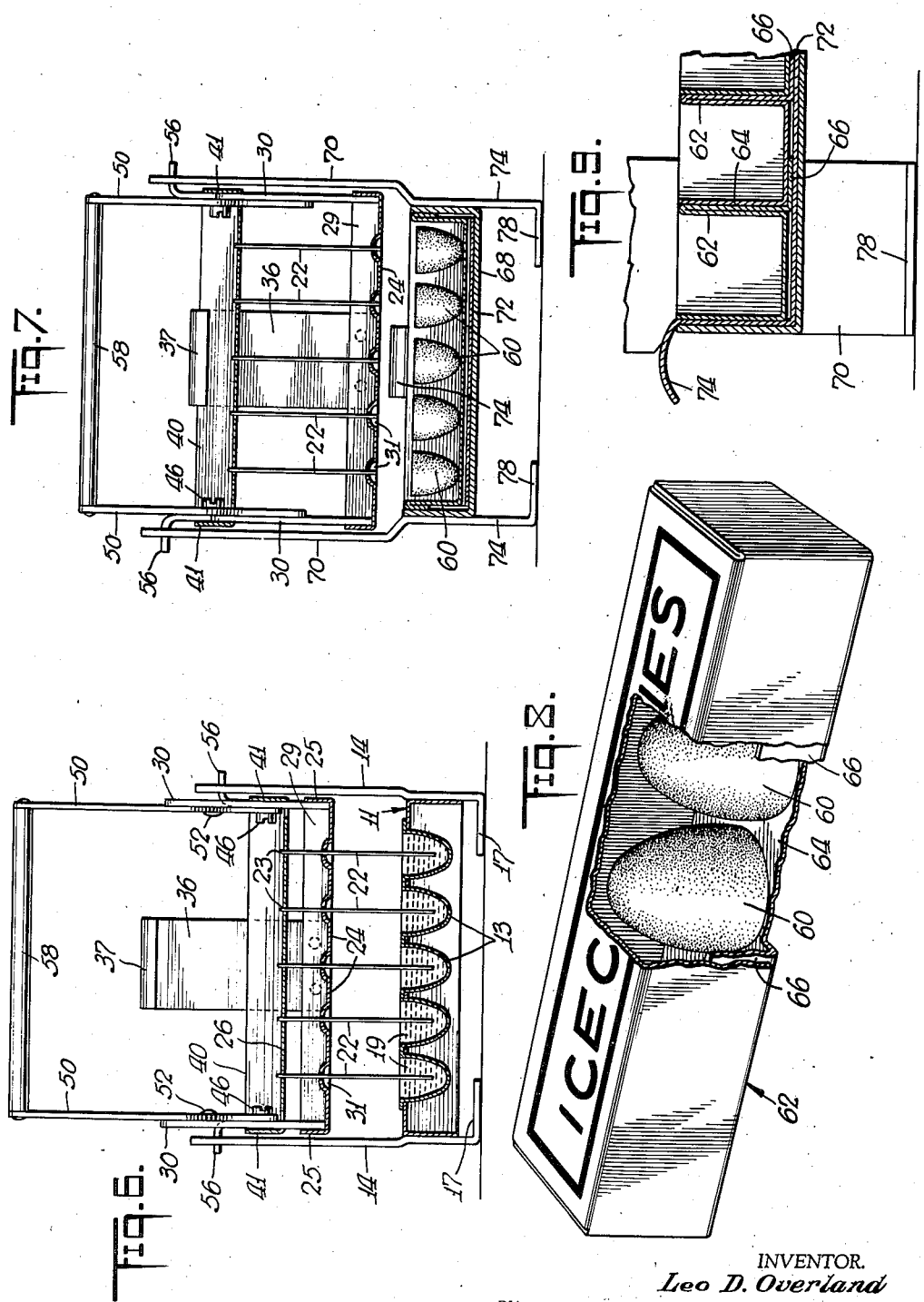

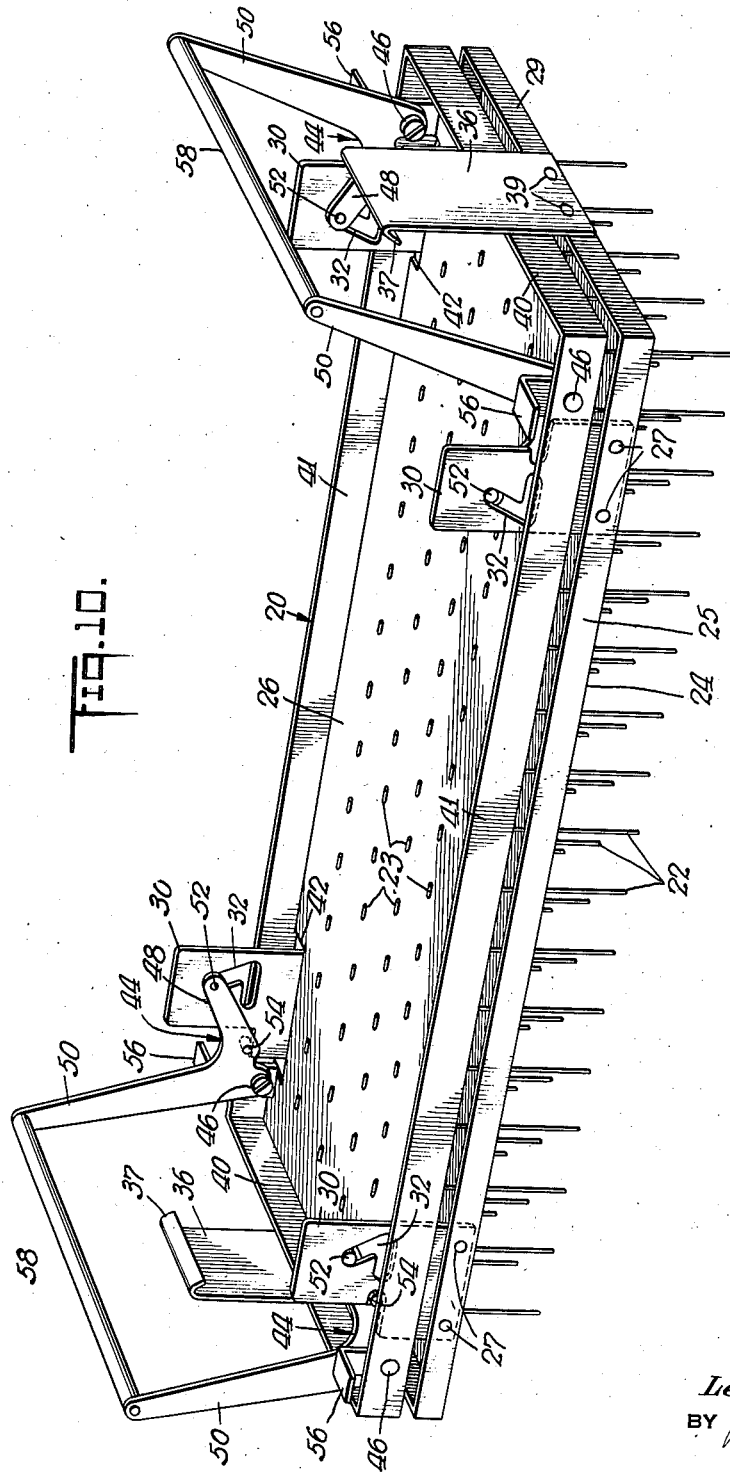

2,310,256

UNITED STATES PATENT OFFICE 2,310,256

APPARATUS FOR MANUFACTURING FROZEN CONFECTIONS

Leo D. Overland, Brooklyn, N. Y., assignor to Joe Lowe Corporation, New York, N. Y., a corporation of Delaware Application November 20, 1940, Serial No. 366,410

8 Claims. (Cl. 107—8)

The present invention relates generally to apparatus for making a plurality of frozen confectionery products simultaneously, and it relates specifically to improvements in the manufacture of large quantities of very small frozen confectionery units of the type simulating what is generally known in the candy trade as "bon-bons."

Since the sale of such products require a plurality of the frozen confectionery units to be retailed in individual boxes at a very low price, it follows that the manufacture and packaging of the individual units into the individual boxes, and the assembly of such boxes in shipping cartons, must be accomplished within a very narrow range of operating costs, involving problems which are difficult of solution. With the present invention, however, these difficulties have been overcome successfully by the use of simple and inexpensive apparatus employing a minimum number of manufacturing operations from the freezing to the packaging of the individual confectionery units.

An object of the present invention is to provide apparatus for manufacturing a plurality of very small frozen confectionery units of the class described in a most efficient and sanitary manner, which eliminates any direct handling of any of the individual units from the time they are formed by refrigeration until the time they are boxed in retail boxes and packages for distribution to the consumer.

A further object of the invention is the provision of a simple, inexpensive and efficient combination spur plate and stripping device which permits the safe and efficient handling of large numbers of such confectionery units simultaneously, and also provides for their individual discharge from their respective spurs in a most efficient and economical manner.

Various other and further objects and advantages of the invention, which result in simplicity, economy and efficiency, will be apparent from the following detailed description, wherein a preferred form of embodiment of the invention is shown, reference being had for illustrative purposes to the accompanying drawings, forming a part hereof, in which:

Fig. 1 is a side elevational view of the apparatus constructed in accordance with the invention, showing, with parts broken away for the sake of clearness, a multi-cavity mold and a combination spur plate and stripping device and illustrating their respective positions during the freezing operation;

Fig. 2 is a plan view, with parts broken away for the sake of clearness, showing the structures of Fig. 1;

Fig. 3 is a view in elevation, with some parts in section, showing the spur plate and its stripping device in its position at the time of release of the confectionery units into a plurality of individual boxes, the latter being shown in transverse section;

Fig. 4 is a sectional plan view of the apparatus shown in Fig. 3, the same being taken along the line 4—4 thereof;

Fig. 5 is a perspective view showing the position of one of the boxes ready to receive its charge of confectionery units;

Fig. 6 is a sectional elevational view of the apparatus shown in Fig. 1, the same being taken along the line 6—6 thereof;

Fig. 7 is a sectional elevational view of the apparatus shown in Fig. 3, the same being taken along the line 7—7 thereof;

Fig. 8 is a perspective view, with parts broken away, showing a box filled with a plurality of confectionery units;

Fig. 9 is an enlarged detailed view, showing an end section of the box holder and its withdrawal tray, with a plurality of boxes being illustrated in transverse section; and Fig. 10 is a perspective view of the combination spur plate and stripping device shown in Fig. 1.

Referring now to the drawings, wherein like numerals indicate like parts, there is shown in Fig. 1, a multi-cavity mold structure 11, having carrying handles 12 and being provided with rows of mold cavities 13. Adjacent each end of the mold structure 11 is mounted a vertical arm 14, having a recess 15 on the top end thereof for receiving and guiding a suspending member of a combination spur plate and stripping device 20. The lower ends of the arms 14 project below the mold structure 11 and are turned inwardly to provide feet 17 for the same, as best shown in Fig. 6. The number of mold cavities 13 to each transverse row correspond to the number of frozen confectionery units desired for an individual retail box. In the illustrations in the drawings, there are eighteen transverse rows of mold cavities, each row consisting of five cavities each. It is apparent, therefore, that each mold structure 11 is capable of producing sufficient confectionery units with each operation to fill eighteen retail boxes with five units each.

The cavities 13 of the multi-cavity mold structure 11 may be filled in any desired manner with a suitable mixture to be frozen, such as ice cream, ice milk, sherbet, water-ice, etc. If desired, each box may be filled with confectionery units of different flavors, and this may be readily provided with uniformity as to all boxes of a group by filling each longitudinal row of cavities 13 with a flavored material which is different from every other longitudinal row.

When the mold cavities 13 are filled with the desired confection material 19 to be frozen, the mold structure 11 may be placed in a brine tank or other refrigerating means, and at such time or prior thereto, the combination spur plate and stripping device 20 hereinafter to be described in detail, is placed over the open-top of the mold structure 11 as best shown in Fig. 1. In this position it will be noted that a projecting spur 22 is positioned centrally of each mold cavity 13.

Referring now to Fig. 10, wherein the combination spur plate and stripping device 20 is best shown, it will be apparent that the same is apparatus of a portable character comprising a pair of superimposed marginal plates 24 and 26, the lower plate 24 having a plurality of spaced openings or apertures 28 therein, which are arranged in rows longitudinally and transversely. The underside of the plate 24 adjacent each opening 28 is concaved upwardly, as indicated at 31, to permit withdrawal of the spurs 22 beyond the contacting surfaces of the plate during the stripping operation. This permits the plate 24 to contact the frozen confectionery units at a point spaced from the spur 22, and permits effective stripping without having a tendency to crack the coating material thereof, which results when the stripping pressure is immediately adjacent the spur 22 as it is being withdrawn. The upper plate 26 is provided with a plurality of similarly spaced depending spurs 22 which are adapted to extend through said openings 28. The spurs may be formed of short pieces of wire, the upper ends of which are bent over and soldered or otherwise secured to the plate 26, as indicated at 23.

A pair of oppositely spaced guide members 30 are mounted adjacent each end of the lower plate 24, and fixedly secured to the marginal side flanges 25 thereof, as indicated at 27, in any suitable manner, such as spot-welding, etc. Each guide member 30 is provided with an internal V-shaped cam conformation 32 and an external cam conformation 34. A plate 36 having an inturned flange 37 is fixedly mounted intermediate each end of the marginal end flanges 29 of the lower plate 24, by spot-welding, as indicated at 39. The flanges 37 serve to limit the downward movement of the lower plate 26 when the plates are moved relative to one another by engaging the marginal end flanges 40 of the upper plate 26.

The upper plate 26 of the combination spur plate and stripping device 20 has upturned marginal side flanges 41, and is provided with spaced slots 42 arranged in pairs adjacent each end for receiving slidably the guide members 30 of the lower plate 24.

A pair of oppositely spaced plural-armed or bell-cranked levers 44 are pivotally mounted on the marginal side flanges 41 adjacent each end of the plate 26 by means of a stud shaft or bolt 46. Each of the levers 44 is provided with a relatively short arm 48 and a relatively long arm 50. Each short arm 48 is provided with a pair of spaced cam members or projecting studs 52 and 54, which are adapted to engage cam conformations 32 and 34, respectively. Laterally projecting arms 56, forming suspension means, may be mounted on the shaft 46, or otherwise fixedly secured to the marginal side flanges 41 of the plate 26, for reasons hereinafter to be described. The long arms 50 of each oppositely disposed pair of levers 44 are transversely connected in any suitable manner by a rod 58, which provides a handle for manipulating and operating the apparatus.

In operation of the combination spur plate and stripping device 20, the plates 24 and 26 are assumed to be together, as shown in Fig. 10, with the handles 58 extending outwardly of the apparatus. In this position the spurs 22 are projected their full distance through the plate 24 so as to be in a position to extend therebelow into each of the cavities 16 of the mold structure 12. The handles 58 may be used to manipulate the apparatus, as for example, carrying it from operation to operation in a plant, or may be used for also operating the apparatus to effect stripping or removal of the confectionery units frozen to the lower ends of the spurs 22 thereof. To effect stripping, the plate 24 must obviously be moved downwardly towards the extreme ends of the spurs 22. The apparatus may be constructed so as to withdraw the spur 22 through the openings 28 of the lower plate, and thus accomplish the same result. In the modification shown, the stripping is effected by moving the handles 58 inwardly of the apparatus toward each other, as shown in Fig. 3. When each of the handles 58 is moved inwardly, the cam member 54 immediately engages the external cam conformation 34, moving the lower plate downwardly over the spurs 22 and the cam member 52 downwardly of the vertical portion of the internal cam conformation 32. When the cam member 52 approaches the apex of the internal cam conformation 32 and passes its dead center position, the cam member 54 has moved across its cam conformation 34 and out of engagement therewith. Further inward movement of the handles 58 causes the lever 50 to move the lever 48 downwardly, forcing the cam member 52 to move along the horizontal portion of its internal cam conformation 32 and push the lower plate 24 downwardly until it reaches the ends of the spurs 22. The stop limiting flanges 37 of the end plates 36 prevent the lower plate from being pushed off the ends of the spurs 22. Thus, it will be apparent that the confectionery units frozen to the lower ends of the spurs 22 are forced therefrom by the pressure exerted by the underside of the plate 24 against the tops thereof. Obviously, reversing the movement of the handles 58 causes a reverse of the operating function above described, bringing the two plates 24 and 26 together again.

When refrigeration has been completed and the congealed confectionery units 60 are formed and bonded to the lower ends of the spurs 22, the mold structure 11 is removed from the brine tank (not shown) with the combination spur plate and stripping device 20 still in position. The mold cavities 13 are defrosted by momentarily dipping the mold structure 11 in warm water. The combination spur plate and stripping device 20 may then be lifted from the mold structure 11, carrying the formed confectionery units 60 on the lower ends of the spurs 22. The frozen confectionery units may then be dipped in chocolate or other suitable conventional coating material preparatory to boxing, or they may be boxed without coating, if desired.

The method of the invention includes the steps of assembling side by side a plurality of boxes equivalent to the number of transverse rows of mold cavities 13 of the mold structure 11. According to the embodiment illustrated in the drawings, there are eighteen transverse rows of mold cavities of five cavities each to a row. Therefore, eighteen boxes must be assembled side by side, and will receive five confectionery units each when they are released from their respective spurs.

The confectionery units 60 in the present instance are shaped like chocolate creams, and are substantially of a thimble formation, hence each having a flat base. The packing boxes 62 are preferably of the general type illustrated in Figs. 5 and 8. These boxes 62 are adapted to be filled from the bottom, and have a bottom closure flap 64 formed with a lip 66. The boxes are placed side by side in a tray 68, having arms 70, with the top of each box being closed and the bottom of each box uppermost, the closure flap 64 and lip 66 being positioned preferably in the manner illustrated in Figs. 3, 4 and 5. Before the tray 68 is loaded with the boxes 62, a removable board 72, having handles 74 at opposite ends, is positioned therein for facilitating removal of the filled boxes 62 from the tray 68 when desired. The arms 70 of the box loading tray 68 are recessed at the top, as indicated at 76, to receive the arms 56 of the combination spur plate and stripping device 20 for suspending and guiding the same over the boxes 62 therein. The lower ends of the arms 70 project below the tray 62 and are turned inwardly, like the arms 14 of the mold, to provide supporting feet 78.

To deposit the individual confectionery units 60 into their respective boxes 62, the combination spur plate and stripping device 20, having the frozen confectionery units 60 still bonded to the lower ends of the spurs 22, is suspended over the loading tray 68, with the suspending arms 56 positioned in the recesses 76 of the arms 70 of the tray 68. This guiding and suspending means assures registration of each transverse row of confectionery units 60 with the particular box in which the confectionery units are to be packed. Thereupon, the handles 58 of the apparatus 20 are moved inwardly to the position shown in Fig. 3, which causes the underside of the stripper plate 24 to descend, forcing the confectionery units from the spurs 22 into the boxes 62.

After the operation last described is completed, the spur plate and stripping device 20 is removed. The removal board 72 is lifted out of the tray 68 by means of the handles 74, the bottom closure flaps 64 are manually moved to closed position, and the boxes 62 are inverted in the position shown in Fig. 8.

By means of the present invention all of the very large number of individual confectionery units 60 may be moved and released by the combination spur plate and stripping device 20 in a few seconds time and simultaneously deposited in a plurality of retail boxes, without any intermediate and unsanitary handling whatsoever, thereby lowering the cost of production by reducing the various manufacturing steps to a minimum, enabling the manufacturer to give the public greater value for a lower retail price than with other known methods now in use.

Although I have only described in detail one form which the invention may assume, it will be apparent to those skilled in the art that the invention is not so limited, but that various modifications may be made therein without departing from the spirit thereof or from the scope of the appended claims.

What I claim is:

1. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent each end a pair of oppositely spaced guide members projecting therefrom towards the other plate, each guide member being provided with a pair of cam conformations the other plate having a pair of oppositely spaced plural-armed levers pivotally mounted thereon in spaced relation adjacent said guide members, one arm of each lever having a pair of cam members which are adapted to engage the cam conformations of its adjacent guide member, and the other arms of each pair of levers being connected to provide a pair of spaced handles for manipulating and operating the apparatus.

2. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent opposite ends a pair of oppositely spaced guide members projecting upwardly therefrom towards the other plate, each guide member being provided with an internal and external cam conformation, the other plate having a pair of oppositely spaced plural-armed levers pivotally mounted thereon in spaced relation and adjacent said guide members, one arm of each lever having a pair of spaced cam members which are adapted to engage the cam conformations of its adjacent guide member, and the other arms of each pair of levers being connected transversely of the apparatus to provide a pair of spaced handles for manipulating and operating the same.

3. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent opposite ends a pair of oppositely spaced guide members projecting upwardly therefrom towards the upper plate, the upper plate having a plurality of spaced slots therethrough for receiving slidably said guide members, each guide member being provided with a pair of spaced cam conformations, the upper plate having a pair of oppositely spaced bell-crank levers pivotally mounted thereon in spaced relation to said slots, one arm of each lever having a pair of spaced cam members which are adapted to engage the cam conformations of its adjacent guide members, and the other arms of each pair of levers being connected transversely of the apparatus to provide a pair of spaced handles for manipulating and operating the same.

4. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent opposite ends a pair of oppositely spaced guide members projecting upwardly therefrom and adapted to extend through openings in the upper plate, the upper plate having a pair of spaced slots adjacent each end for receiving slidably said guide members, each guide member being provided with a pair of cam conformations, the upper plate having a pair of oppositely spaced plural-armed levers pivotally mounted thereon in spaced relation to said slots, the short arm of each lever being provided with a pair of spaced cam members which are adapted to engage the cam conformations of its adjacent guide member, and the longer arms of each pair of levers being connected transversely of the apparatus to provide a pair of spaced handles for manipuating and operating the same.

5. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent opposite ends a pair of oppositely spaced guide members projecting upwardly therefrom and adapted to extend through the upper plate, the upper plate having a pair of spaced slots adjacent each end for receiving slidably said guide members, each guide member being provided with an external and internal cam conformation, the upper plate having a pair of oppositely spaced bellcrank levers pivotally mounted thereon in spaced relation to said slots, one arm of each lever having a pair of spaced cam members which are adapted to engage the cam conformations of its adjacent guide member, the cam engaging the external conformation operating during one portion of the movement of the plates and the cam engaging the internal conformation operating during another portion of said movement, and the other arms of each pair of levers being connected transversely of the apparatus to provide a pair of spaced handles for manipulating and operating the same.

6. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent opposite ends a pair of oppositely spaced guide members projecting upwardly therefrom and adapted to extend through openings in the upper plate, the upper plate having a pair of spaced slots adjacent each end for receiving slidably said guide members, each guide member being provided with a pair of spaced cam conformations, the upper plate having a pair of oppositely spaced plural-armed levers pivotally mounted thereon, said arms of said levers being of different lengths, the short arm of each lever being provided with a pair of spaced cam members which are adapted to engage the cam conformations of its adjacent guide member, and the longer arms of each pair of levers being connected transversely of the apparatus to provide a pair of spaced handles for manipulating and operating the same.

7. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent opposite ends a pair of oppositely spaced guide members projecting upwardly therefrom and adapted to extend through openings in the upper plate, the upper plate having a pair of spaced slots adjacent each end for receiving slidably said guide members, means for limiting the movement of said plates relative to one another, each guide member being provided with a pair of spaced cam conformations, the upper plate having a pair of oppositely spaced plural-armed levers pivotally mounted thereon, said arms of said levers being of different lengths, the short arm of each lever being provided with a pair of spaced cam members which are adapted to engage the cam conformations of its adjacent guide member, and the longer arms of each pair of levers being connected transversely of the apparatus to provide a pair of spaced handles for manipulating and operating the same.

8. A portable apparatus of the character described comprising a pair of superimposed slidably mounted plates, the lower plate having a plurality of spaced apertures therein and the upper plate having a plurality of similarly spaced depending spurs adapted to extend through said apertures, said lower plate having adjacent opposite ends a pair of oppositely spaced guide members projecting upwardly therefrom and adapted to extend through openings in the upper plate, the upper plate having a pair of spaced slots adjacent each end for receiving slidably said guide members, each guide member being provided with an internal and external cam conformation, the upper plate having a pair of oppositely spaced plural-armed levers pivotally mounted thereon, one arm of each lever being provided with a pair of spaced cam members which are adapted to engage the cam conformations of its adjacent guide member, the cam member nearest the pivotal axis engaging the external cam conformation and the other cam member engaging the internal cam conformation, said cams being adapted to operate at different times during the movement of the plates, and the other arms of each pair of levers being connected transversely of the apparatus to provide a pair of spaced handles for manipulating and operating the same.

LEO D. OVERLAND.